Dec. 29, 1931.    J. LEDWINKA    1,838,852
COWL CONSTRUCTION AND THE METHOD OF MANUFACTURING SAME
Filed Dec. 21, 1927    2 Sheets-Sheet 1
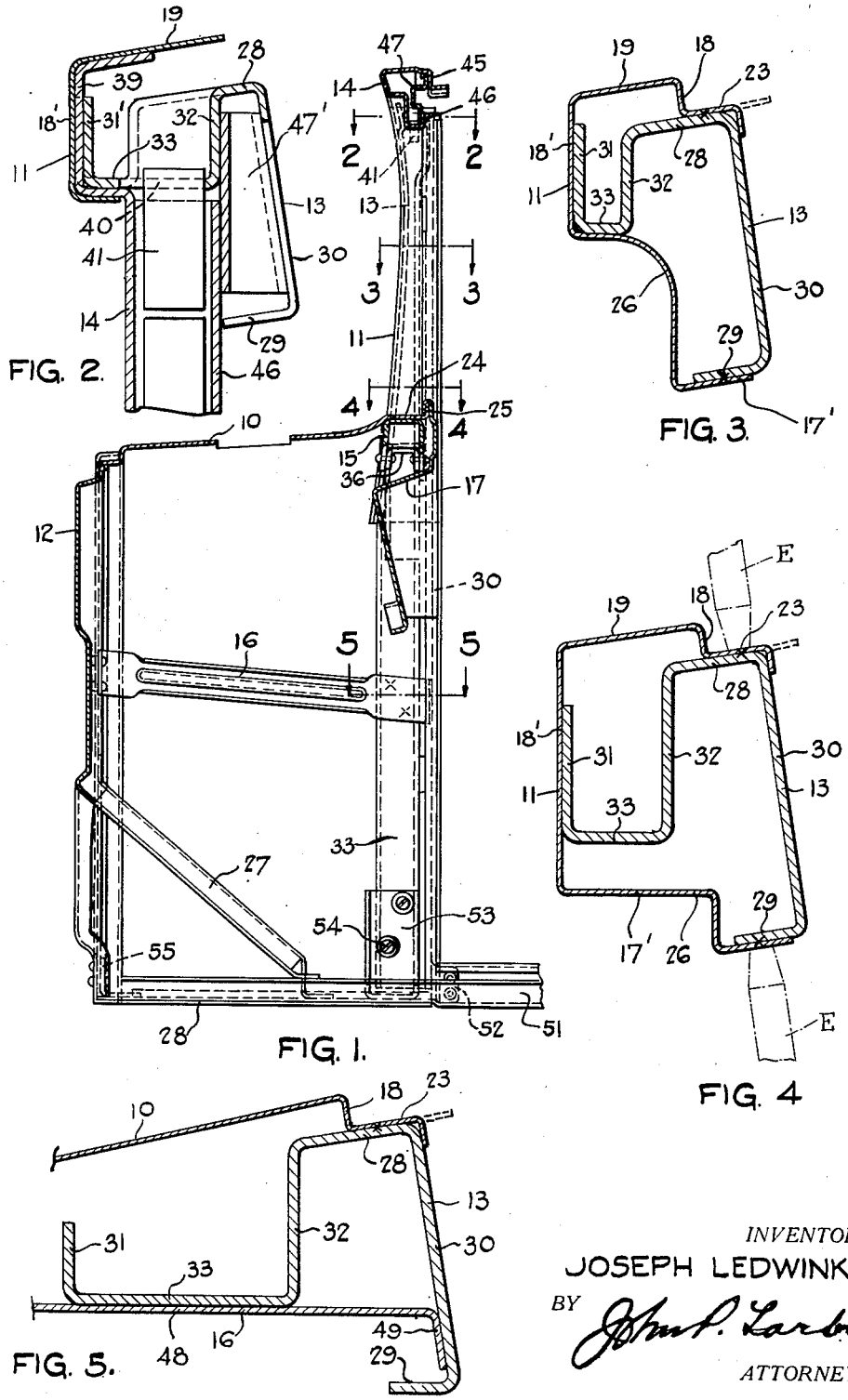
INVENTOR.
JOSEPH LEDWINKA.
BY
ATTORNEY.

Dec. 29, 1931.   J. LEDWINKA   1,838,852
COWL CONSTRUCTION AND THE METHOD OF MANUFACTURING SAME
Filed Dec. 21, 1927   2 Sheets-Sheet 2

INVENTOR.
JOSEPH LEDWINKA.
BY
ATTORNEY.

Patented Dec. 29, 1931

1,838,852

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

COWL CONSTRUCTION AND THE METHOD OF MANUFACTURING SAME

Application filed December 21, 1927. Serial No. 241,691.

My invention relates to cowl structures for vehicle bodies and to a method of assembling such structures.

More particularly, my invention relates to that class of cowl structures made of metal and in which the front posts both above and below the belt line are finished and reinforced by sheet metal paneling.

It is an object of my invention to provide a front or cowl structure of this class which can be economically manufactured and which is light in weight, while yet very strong, rigid and durable so as to permit rough handling prior to final assembly, and to stand up under the wracking strains to which such bodies are subjected in use.

I attain these objects by first assembling the cowl panel proper and the vertical extensions thereof forming the cover for the A-posts above the belt line into an integral sub-assembly unit open rearwardly, and in telescoping the sub-assembled front or A-posts interconnected by a transverse member or transverse members arranged above and below the windshield opening into the open rear of the panel unit and securing the sub-assemblies in final assembly. This method of assembly provides an openness of joint which enables me to use to a maximum degree that most economical and efficient method of joining sheet metal, namely, spot or projection welding. By forming the cover panels for the A-posts above the belt line of generally rearwardly presenting channel form and the A-posts of generally forwardly presenting channel form, the A-posts are readily telescoped within the panel covers therefor, so as to be substantially covered on front and sides and are readily joined simultaneously on the opposite side thereof, by one and the same welding operation, to form a closed box formation. The A-post is of a form to render it exceedingly strong and rigid for the small amount of metal it contains by extending its outer side wall forwardly to provide an extension of angular section having a transversely extending arm, which is adapted to lie in the upper portion of the post, against the inside of the bottom wall of the cover, and thus aid in the assembly in proper position of the sub-assembly post and panel units, and when assembled, forming a brace for the bottom wall of the covering paneling. Furthermore, the section of the A-post also lends itself well to the strong attachment of cross members and cow braces, etc.

Other and further objects and advantages and the manner in which they are attained will become apparent from the following detailed description when read in connection with the accompanying drawings and in which:

Fig. 1 is a central longitudinal sectional view through a cowl structure embodying my invention.

Figs. 2, 3, 4 and 5 are detail sectional views taken respectively, on the correspondingly numbered lines of Fig. 1.

Figure 6:
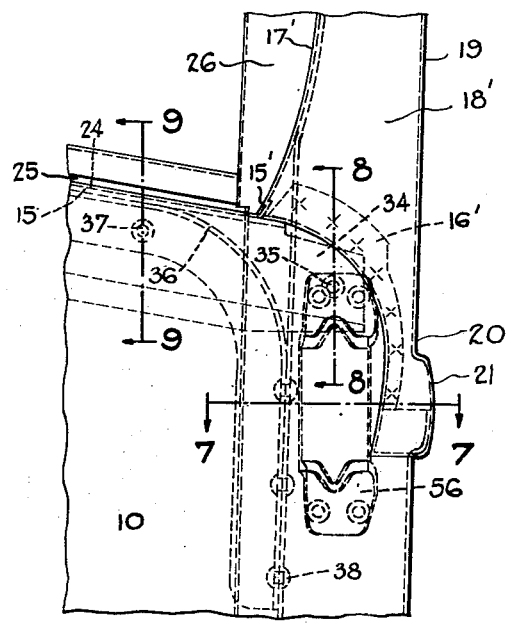
Fig. 6 is a view, in front elevation, of the A-post cover and A-post where it joins the upper edge of the cowl panel, interior frame members being shown in dotted lines.

In the drawings the principal elements of the cowl structure comprise the cowl panel proper 10, the upward extensions 11 thereof covering the front or A-posts, the shroud pan 12, the front or A-posts proper 13, the upper and lower cross members 14 and 15 connecting the A-posts, the cowl side braces 16, and the instrument board panel 17.

The front edge of the cowl panel 10 is reinforced, as usual, by the shroud pan 12, suitably secured thereto as by welding, and its rear edge is, in the final assembly, reinforced by the A-post 13 and the lower cross member 15. At the sides the A-posts are extended up through suitable openings provided therefor in the cowl panel and in order to enable the cowl panel proper to be effectively joined to the extension 11 it is formed with flanges 15' and 16', respectively, at the inside and front edges of said openings, see Fig. 6. The extensions 11 are of rearwardly presenting channel section, and in the assembly of the cowl panel proper 10 and the extensions the lower edges of inner side walls 17' of the channels are secured as by spot welding to the flanges 15', the front or bottom walls 18' of the channels which have their lower edges formed on a curve to conform to the curvature of the cowl panel, are also secured as by spot welding, to the curved flanges 16' at the front edges of the openings in the cowl panel and the outer walls 19 of the channels are extended downwardly at 20 and beaded as at 21, these beaded lower edges overlapping corresponding beaded upper outer edges of the cowl panel openings and the parts being joined here by spot welding through the beaded portions. This spot welding at the beaded or raised portions permits ready cleaning off of the spot weld marks by grinding or otherwise.

From the foregoing description, it will be seen that the extensions 11 are joined to the rear edges of the cowl panel proper 10 in the manner described very readily because of the general openness of the joints in the absence of the posts and connecting frame members of the cowl, and an integral panel unit sub-assembly is formed after joinder which can be readily handled for the finishing operations at the joints and which is well adapted to be jigged and joined in the final assembly to the frame parts.

The rear edges of the cowl panel proper and upward extensions 11 are formed with rabbets 18 to receive the edge of the adjacent door panel, the inner arms of these rabbets, as 23, being prior to the final assembly extended rearwardly, as shown in the dotted line position of Figs. 3 and 4, to permit the easy assembly of the frame parts therewith in final assembly, as will presently be described. The upper edge of the cowl is formed with a transversely arched portion 24 substantially horizontal when viewed in section, and the rear edge of this portion is provided with an upturned flange 25 which parts 24 and 25 together form a rabbet to receive the lower edge of the windshield. The inner walls 17' of the panel extensions 11 for covering and reinforcing the parts are provided with rabbets 26 to receive the lateral edges of the windshield.

The sub-assembly panel unit then comprises as principal elements the cowl panel proper 10 and the integral vertical extensions 11 at the rear edges thereof, and the shroud pan 12. It may also include the cowl side braces 16 joined to the shroud at their forward ends as by riveting and left free at their rear ends to be joined, in final assembly, to the A-posts, and the toe-board supports 27 also joined to the shroud pan as by welding, and having their rear ends spaced slightly from the bottom of the cowl panel which is inwardly flanged, as at 28, in a usual manner along its bottom edge.

The framework sub-assembly includes the A-posts 13 and the upper and lower cross members 14 and 15 connecting said posts. The A-posts of my invention are of a novel cross-sectional structure, being as is clearly shown in Figs. 3, 4 and 5, for the most part of a forwardly presenting channel section, the outer and inner side walls of which are designated 28 and 29 and the bottom wall which forms the jamb face of the door opening, is designated 30. This main channel section portion of the post is, however, greatly strengthened and reinforced by a forward extension of its outer wall 28, which is shown to be of outwardly presenting channel section, the side and bottom walls of which are designated 31, 32, 33. The section of this channel varies from top to bottom being narrowest at the upper portion in the line of vision, so that the post structure interferes very little with maximum vision, and widest in the lower portion where greater strength is desirable and in order to secure a strong anchorage to the sill.

Figure 7:
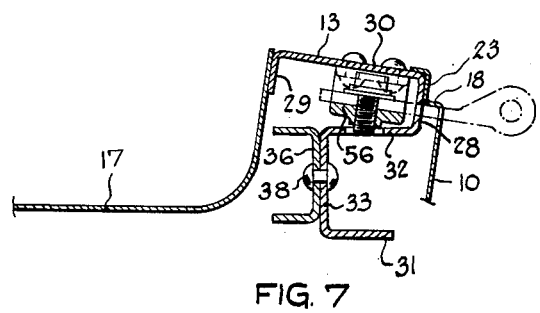
Figs. 7, 8 and 9 are detail sectional views taken, respectively, on the correspondingly numbered section lines of Fig. 6.
Figure 8:
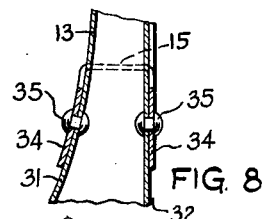
Figure 10:
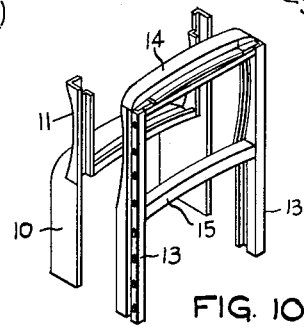
Fig. 10 shows more or less diagrammatically and in perspective, the main sub-assembly units of the cowl structure prior to their final assembly to form the cowl unit.
Figure 9:
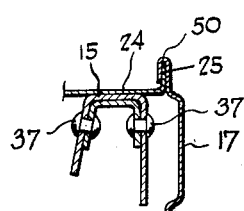

The lower cross member 15 joining the A-posts is of a downwardly presenting channel form as clearly appears in Figs. 1, 8 and 9, and is of transversely arched section conforming to the curvature of the rear portion 24 of the cowl panel. At its ends it is very strongly joined to the A-post structures by having its extended side walls 34 overlap as shown in Fig. 8, the outside walls 31 and 32 of the reinforcing outwardly facing channel section portions of the A-posts, and secured to said walls by rivets 35. In addition, it is braced to the posts by curved channel braces 36, the straight inner ends of which nest within the channel member 15 and are rigidly secured thereto as by rivets 37, see Figs. 6 and 9. The straight outer ends of the braces 36 have their bottom walls lying against the walls 33 of the posts and are secured thereto, as by rivets 38, see Figs. 6 and 7.

At the top the A-posts are joined by a rearwardly presenting channel cross member 14. The ends of the front or base wall of which are, in horizontal section, of rearwardly presenting channel form as shown in Fig. 2 at 39. The extreme upper ends of the posts are of outwardly presenting channel section, see Fig. 2, the forward side walls of which are upwardly extended rearwardly offset portions 31' of the side walls 31 of the posts and the front portions of the bottoms of the channel being upward extensions of walls 33, the angular extensions so formed being nested within the channel section portions 39 of the ends of the cross members and secured thereto, as by spot welding. The bottom walls of the upper ends of the outwardly presenting channel section ends of the posts are cut away, as at 40, and angle braces 41 extend through the openings so formed and have their arms joined as by welding respectively, to the A-posts and to the bottom side wall of the cross member 14. The upper and lower side walls of the cross member are flanged at 45 and 46 and braced by strips 47 connecting the flanges 45 and 46. The flange 45 is formed with a rabbet to receive the forward edge of the roof structure. The cross member 14 is further joined to the A-posts by offset strips 47' secured at opposite ends, respectively, to the rear walls 34 of the A-posts and to the flange 16 and portions 32 of the A-posts, as by spot welding.

The sub-assembly comprising the A-posts 13 and cross members 14 and 15 are well adapted to be readily assembled with the panel sub-assembly hereinbefore described in the following novel manner.

The panel sub-assembly being rearwardly open, is placed in a jig with its rear edge arranged substantially horizontally, and the frame sub-assembly is dropped into the rear end of the panel sub-assembly. In this procedure, the posts telescope with the rear edges of the cowl panel proper 10 and the upward extensions 11 thereof, the outer side wall 28 of the main forwardly facing channel portion of the post fitting within the inner arm 23 of the rabbet 18 formed at the rear edge of cowl panel proper 10 and post cover extension 11, the inner side wall 29 at the top fitting within the rear offset portion of inner side wall 17' of the panel extension 11 and the forward wall of the post 31 resting against the bottom wall 18' of said extension and the wall 33 except at the lower portion of the windshield opening against the outside wall of the windshield receiving rabbet 26. At the same time the transverse cross brace 15 telescopes with and fits against the part 24 of the cowl panel. In their lower portions the posts telescope the rear ends of the braces 16 and come to rest with the rear flattened portion 48 seated against the wall 33 of the post and the flanged rear end 49 resting against the bottom wall 30 of the main forwardly presenting channel section portion of the A-post. Thus the parts are positioned with relation to each other in corrected relation for final assembly without extensive jigging operations the parts naturally falling into place for joinder. The joinder of the sub-assemblies so brought into position for final assembly is now accomplished by very simple and expeditious welding operations as by spot or projection welding, see Fig. 4.

In Fig. 4 I have illustrated how the channel post members 13 and the upper channel extension 11 of the panel unit may be quickly joined by bringing into engagement with the opposite telescoped side walls of the A-post structure the electrodes E—E of a pinch welding device and when the proper pressure has been applied pass the welding current through the metal of the post from electrode to electrode. In this way the channels 13 and 11 are joined simultaneously on opposite sides thereof to form in effect a closed box section post structure of exceptional strength and rigidity. In practice, the panel and frame sub-assemblies are joined in this way while in the assembly jig in which they are brought together at a few spaced points, say three, along the length of the post to keep them in this assembled relation, after which they are transferred to a universally mounted jig, in which the partly assembled cowl structure may readily be swung to various positions to bring it into proper relation to the electrodes of a welding machine or a battery of such machines, each adapted to perform a certain operation or set of operations, and the parts are finally joined, by welding at other places along the rear edges of the cowl panel proper 10 and the cowl panel extensions 11, by welding along the upper edge 24 of the cowl to join cowl panel and cross member, by welding the flattened ends 48 of the cowl braces 16 to the walls 33 of the posts, and by welding the flanges 49 of said braces to the wall 30 of said posts.

After the cowl panel sub-assembly and the post and windshield frame sub-assembly have been telescoped into each other the rear edge of the wall 23 of the rabbet 22 may be turned inwardly against the part wall 30 as indicated in full lines at 23' in Figs. 3 and 4.

Finally the instrument board panel 17 may be applied to the cowl structure by crimping its upper edge 50 over the flange 25 at the rear edge of the cowl panel proper 10 and by welding its side edges to walls 29 of the posts.

When the cowl structure has been assembled, it may be assembled with the side sill 51 of an adjoining unit by having the sill telescope into the cowl, the flange 28 on the lower edge of the cowl being welded to the bottom of the sill, while the toe-board support 27 is welded at its rear end to the top of the sill and the A-post is joined to the sill by a tab 52 at the bottom thereof overlapping a wall of the sill and secured thereto as by riveting, and by a bracket as 53 having one arm joined to the wall 33 of the post as by screws or bolts 54 and the other arm secured to the sill. The forward end of the sill may be further joined to the cowl by an angle bracket 55.

Hinge brackets 56 one of which is disclosed in Figs. 6 and 7 may readily be secured between the walls 30 and 32 of the post by riveting the same to the rear wall 30 of the post.

While I have herein described a specific embodiment of my invention it will be understood the various changes and modifications could be made therein without departing from the spirit of the invention, and all such changes and modifications are intended to come within the spirit and scope of the appended claims.

What I claim is:—

1. The method of assembling sheet metal cowl structures for automobile bodies which consists in sub-assembling the cowl panel and the upwardly extending front post cover panels to form a unitary sub-assembly generally open in rearward direction, and in sub-assembling the front posts and a cross connection therefor below the windshield opening to form a second sub-assembly, and in thereafter bringing said sub-assemblies in assembled relation by relative endwise movement and securing them together by simultaneously spot welding the panels to the opposite sides of the front posts.

2. The method of assembling sheet metal cowl structures for automobile bodies which consists in sub-assembling the cowl panel and the vertical post cover panel extensions at the rear side edges of the cowl panel, and in sub-assembling the front posts and a cross connection therefor below the windshield opening to form a second sub-assembly, in thereafter bringing said sub-assemblies in assembled relation by relative endwise movement, and in joining the sub-assemblies when in said relation.

3. A vehicle body post adjacent a doorway opening comprising a sheet metal stamping of a cross section throughout its length including oppositely presenting channels having a side wall in common, the other side wall of one of said channels forming a door jamb.

4. A vehicle body post comprising a sheet metal stamping having a main portion of forwardly presenting channel cross section, the outer arm of said channel being extended forwardly by a portion of outwardly presenting channel section.

5. A vehicle body post structure, comprising a main member having a forwardly presenting channel section portion one of the arms of which is extended forwardly by an angular portion and a covering and reinforcing stamping of generally rearwardly presenting channel form having its side walls rigidly secured to the side walls of said channel section portion of the main member and its bottom wall backed by said extension.

6. A vehicle body front post structure forming body and windshield framing and outer paneling and comprising a main post stamping having a forwardly presenting channel section portion, and a covering and reinforcing stamping of generally rearwardly presenting channel form having a telescopic engagement with the outer side walls of the main member and having its side walls welded directly to the side walls of the main member, the bottom wall of said main member forming a door jamb.

7. A vehicle body front post structure rising at the side of the windshield opening comprising a main post stamping having a forwardly presenting channel section portion and a covering and reinforcing stamping of generally rearwardly presenting channel form having a telescopic engagement with the outer side walls of the main member and having its side walls rigidly and directly secured to the side walls of the main member, said rearwardly presenting channel form member having its outer side wall formed with a door overlap receiving rabbet and its inner side wall with a windshield receiving rabbet.

8. A vehicle body post structure comprising a main member having a forwardly presenting channel section portion, the outer side wall of which is extended forwardly by an outwardly presenting channel section portion, and a cover panel secured along its edges, respectively, to the side walls of said forwardly presenting channel section portion and having a rabbet between its edges to receive the edge of the windshield, said forward extension of the main member being nested within the angle formed by the bottom wall of said cover panel and a side wall of the rabbet formed therein.

9. In a vehicle body construction, front posts having portions thereof of transversely presenting channel section, a cross connecting member of downwardly presenting channel section having its side walls extended to overlap the side walls of the said channel section portions of the posts and secured thereto, said cross member being additionally secured to the posts by brace members each secured at one end to the channel member and at the other end to the bottom wall of the said channel section portion of the adjacent post.

10. In a vehicle body construction, a top windshield header connecting the front posts, having its ends of rearwardly presenting channel section, and the front posts having their upper forward portions offset, the offset portions nesting within and being secured to the channel section ends of the header.

11. A sub-assembly unit for vehicle bodies comprising a cowl panel extending a substantial distance forwardly of the windshield to form the sides and top of the cowl, and vertical extensions integrally joined to the rear corners of said cowl panel, said vertical extensions being formed of hollow cross section facing inwardly of the body and adapted to cover the upper portions of separate front posts and being rabbeted on their inner sides to form the sides of a windshield frame adapted to receive the edge of the windshield, in the final assembly of said unit with adjacent units.

In testimony whereof he hereunto affixes his signature.

JOSEPH LEDWINKA.